United States Patent
Nichogi et al.

(10) Patent No.: US 7,330,189 B2
(45) Date of Patent: Feb. 12, 2008

(54) INFORMATION PROCESSING SYSTEM FOR DISPLAYING IMAGE ON INFORMATION TERMINAL

(75) Inventors: Mutsuko Nichogi, Tokyo (JP); Katsuhiro Kanamori, Nara (JP); Yoichi Miyake, Chiba (JP); Norimichi Tsumura, Chiba (JP); Makoto Oishi, Saitama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 861 days.

(21) Appl. No.: 10/758,332

(22) Filed: Jan. 15, 2004

(65) Prior Publication Data
US 2004/0183828 A1 Sep. 23, 2004

(30) Foreign Application Priority Data
Jan. 15, 2003 (JP) ............................ 2003-007191

(51) Int. Cl.
| | |
|---|---|
| G09G 5/02 | (2006.01) |
| G09G 3/30 | (2006.01) |
| G03F 3/08 | (2006.01) |
| G06F 3/00 | (2006.01) |
| G06K 9/36 | (2006.01) |
| G06K 9/00 | (2006.01) |
| H04N 5/228 | (2006.01) |
| G06F 3/48 | (2006.01) |
| G09G 1/28 | (2006.01) |
| G06K 1/00 | (2006.01) |
| G06K 15/22 | (2006.01) |
| H04N 5/26 | (2006.01) |

(52) U.S. Cl. .................. 345/589; 345/591; 345/619; 345/660; 345/698; 348/22.1; 348/231.2; 348/584; 358/1.2; 358/518; 358/523; 382/162; 382/167; 382/286; 382/276; 715/745; 715/722; 715/800; 715/815

(58) Field of Classification Search ................ 345/428, 345/581, 589–594, 597, 619; 382/167, 162, 382/276, 282, 284, 286, 305, 295; 348/222, 348/231, 441, 445, 474, 582, 567, 584, 578, 348/602; 715/745, 523, 526, 722, 788, 798, 715/800, 815
See application file for complete search history.

(56) References Cited

U.S. PATENT DOCUMENTS

2003/0161628 A1* 8/2003 Ito et al. ..................... 396/564
(Continued)

FOREIGN PATENT DOCUMENTS

EP 1 050 846 A 11/2000
(Continued)

OTHER PUBLICATIONS

European Search Report for Application No. EP 04 00 0503, dated Sep. 26, 2007.

Primary Examiner—Wesner Sajous
(74) Attorney, Agent, or Firm—RatnerPrestia

(57) ABSTRACT

An information display device and an information processor for performing, in the case where an image is delivered to information terminals such as a mobile phone varied in display, optimum image processing in accordance with performance of the display of each of the information terminals and content information including a material and an object distance contained in the image in addition to a framework of a color conversion by a color management technology. The information display device and the information processor are also capable of changing parameters of the image processing in accordance with a user image preference and an image texture input by the user.

25 Claims, 17 Drawing Sheets

U.S. PATENT DOCUMENTS

2003/0184803 A1* 10/2003 Yamada et al. ............ 358/1.16

FOREIGN PATENT DOCUMENTS

| EP | 1 052 598 A | 11/2000 |
|---|---|---|
| JP | 09-233490 | 9/1997 |
| JP | 2002-108757 | 4/2002 |
| WO | WO 02/069275 A | 9/2002 |

* cited by examiner

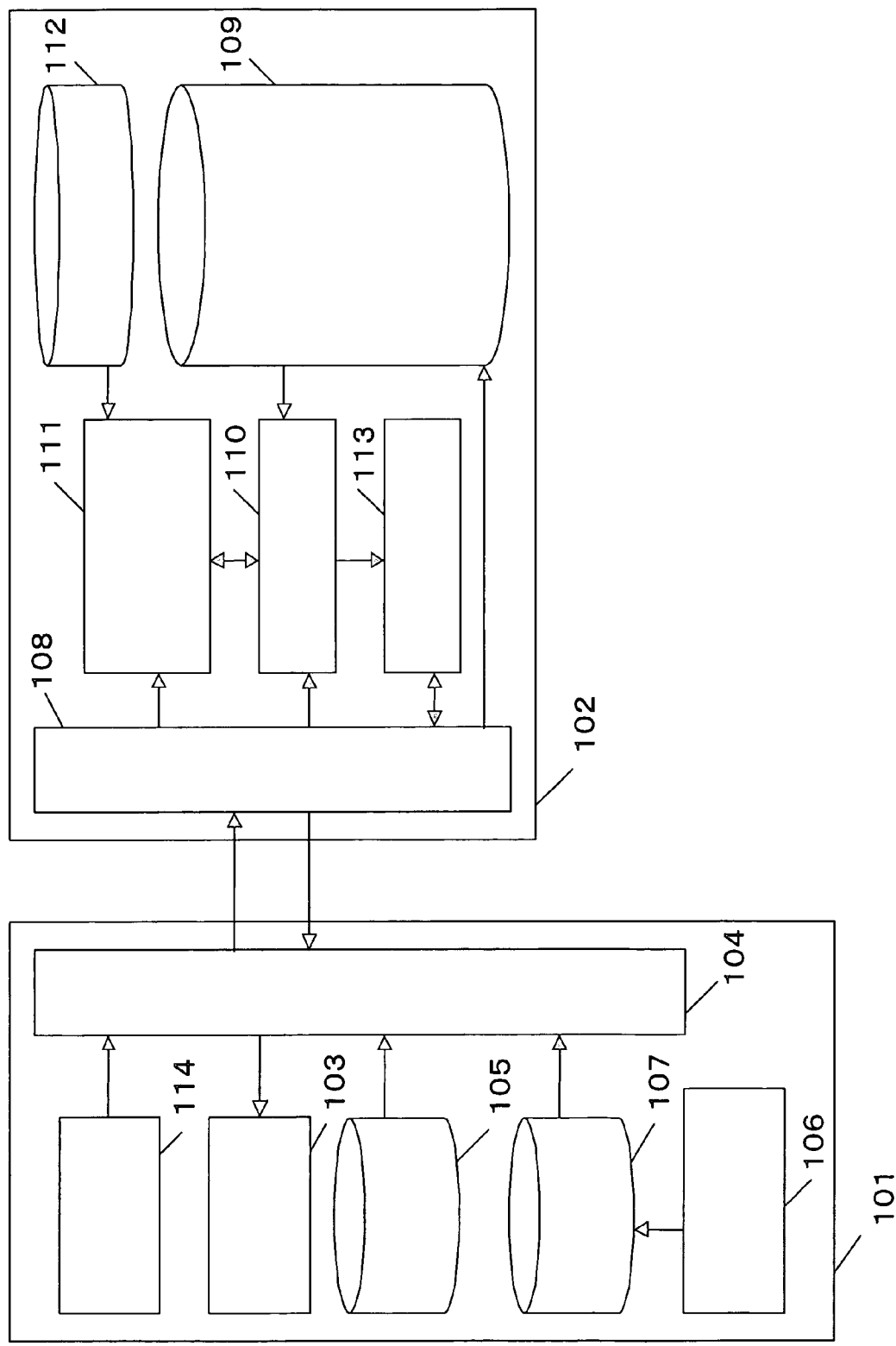

FIG.2

```
<?xml version="1.0"?>
<rdf:RDF xmlns:rdf=http://www.w3.org/19999/02/22-rdf-syntax-ns#>
  <rdf:Description>
    <prf:Vendor>Panasonic</prf:Vendor>
    <prf:ImageCapable>Yes</prf:ImageCapable>
    <prf:ColorCapable>Yes</prf:ColorCapable>
    <prf:BitsPerPixel>24</prf:BitsPerPixel>
    <prf:ScreenSize>120x102</prf:ScreenSize>
    <prf:Gamma>2.1 </prf:Gamma>
    <prf:RedColorant>(0.64,0.33) </prf: RedColorant >
    <prf:GreenColorant>(0.30,0.60) </prf:GreenColorant>
    <prf:BlueColorant>(0.15,0.06) </prf:BlueColorant>
    <prf:WhiteColorant>(0.3127,0.3290) </prf:WhiteColorant>
    <prf:Luminance>100</prf:Luminance>
    <prf:AmbientIlluminant>dark</prf: AmbientIlluminant >
    <prf:CcppAccept>
      <rdf:Bag>
        <rdf:li>image/gif</rdf:li>
      </rdf:Bag>
    </prf:CcppAccept>
  </rdf:Description>
</rdf:RDF>
```

FIG.3

Profile Class: AToB0Tag redColorantTag
greenColorantTag
blueColorantTag
redTRCTag
greenTRCTag
blueTRCTag
mediaWhitePointTag
...

FIG.4

| 6 | 6 | 6 | 6 | 6 | 6 | 6 | 6 | 6 |
|---|---|---|---|---|---|---|---|---|
| 6 | 6 | 6 | 6 | 6 | 1 | 1 | 6 | 6 |
| 6 | 6 | 6 | 2 | 2 | 1 | 1 | 5 | 6 |
| 6 | 6 | 6 | 2 | 2 | 1 | 1 | 5 | 6 |
| 6 | 6 | 6 | 2 | 2 | 1 | 1 | 5 | 6 |
| 6 | 6 | 6 | 2 | 2 | 2 | 5 | 5 | 6 |
| 6 | 6 | 6 | 2 | 2 | 2 | 5 | 5 | 6 |
| 6 | 6 | 6 | 6 | 6 | 6 | 6 | 6 | 6 |
| 6 | 6 | 6 | 6 | 6 | 6 | 6 | 6 | 6 |
| 6 | 6 | 6 | 6 | 6 | 6 | 6 | 6 | 6 |

501

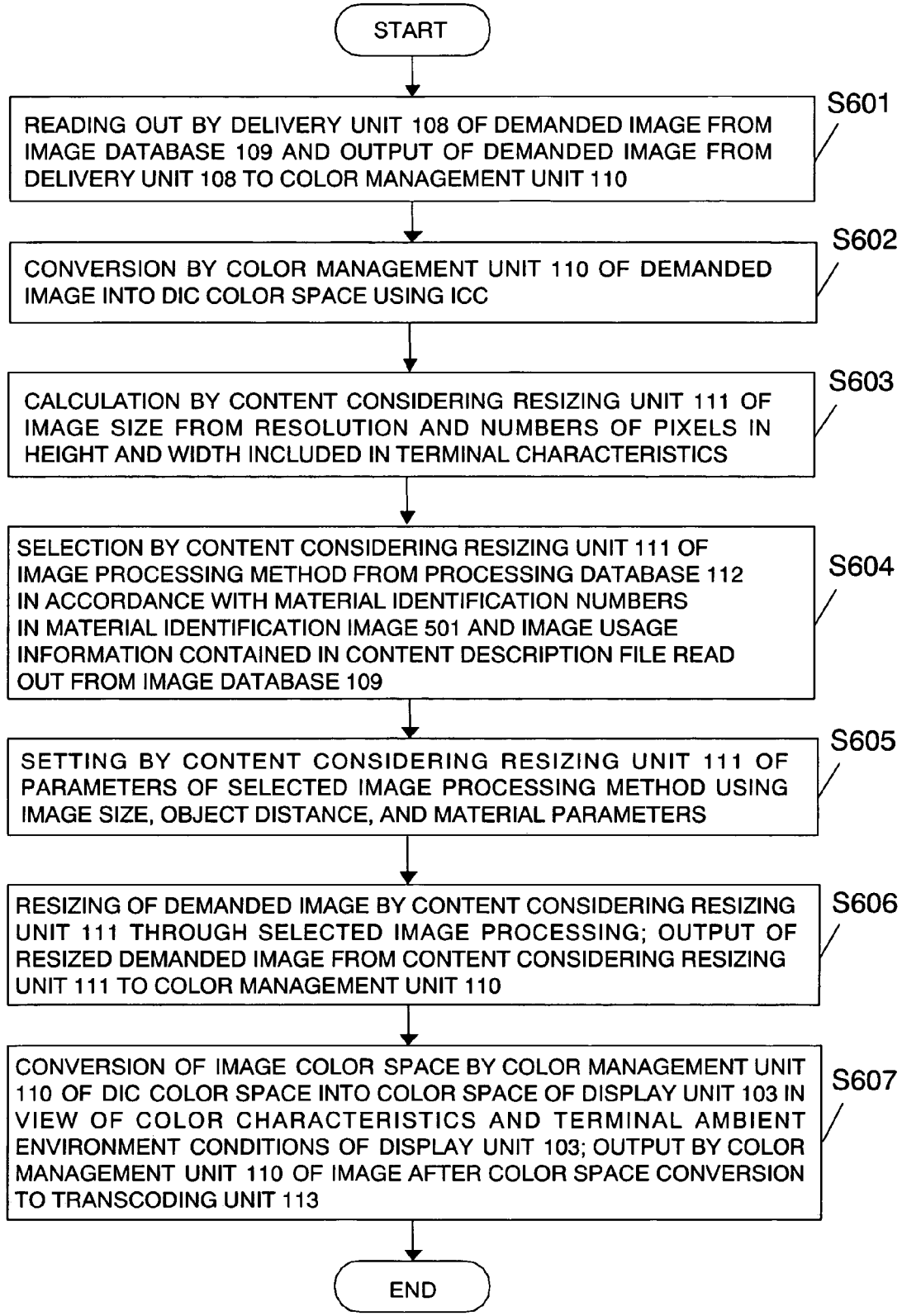

FIG.6

| MATERIAL IDENTIFICATION NUMBER / IMAGE USAGE | NATURAL IMAGE | CG |
|---|---|---|
| 1: METAL | GRANULARITY EMPHASIS PROCESSING + GLOSSINESS AND LIGHTNESS EMPHASIS PROCESSING | GLOSSINESS AND LIGHTNESS EMPHASIS PROCESSING + COLOR GAMUT ENLARGEMENT PROCESSING |
| 2: PLASTIC | GRANULARITY EMPHASIS PROCESSING + GLOSSINESS AND LIGHTNESS EMPHASIS PROCESSING | GLOSSINESS AND LIGHTNESS EMPHASIS PROCESSING + CHROMATICNESS EMPHASIS PROCESSING + COLOR GAMUT ENLARGEMENT PROCESSING |
| 3: VINYL | GRANULARITY EMPHASIS PROCESSING + IMAGE GAMMA CONVERSION PROCESSING + EDGE EMPHASIS PROCESSING | IMAGE GAMMA CONVERSION |
| 4: GLASS | GRANULARITY EMPHASIS PROCESSING + IMAGE GAMMA CONVERSION | IMAGE GAMMA CONVERSION |
| 5: CLOTH | GRANULARITY EMPHASIS PROCESSING + EDGE EMPHASIS PROCESSING | CHROMATICNESS EMPHASIS PROCESSING + COLOR GAMUT ENLARGEMENT PROCESSING |
| 6: OTHERS | GRANULARITY EMPHASIS PROCESSING + EDGE EMPHASIS PROCESSING | COLOR GAMUT ENLARGEMENT PROCESSING |

FIG.7A

| MATERIAL GRANULARITY \ OBJECT DISTANCE | 30cm | 50cm |
|---|---|---|
| σ<1 mm | 3 | 5 |
| 1 mm<σ<1 cm | 2 | 3 |
| 1 cm<σ<3 cm | 1 | 2 |
| 3 cm<σ | 1 | 2 |

FIG.7B

| MATERIAL IDENTIFICATION NUMBER \ TARGET IMAGE SIZE | 120x150 | 1280x1024 |
|---|---|---|
| 1: METAL | 2 | 1 |
| 2: PLASTIC | 5 | 3 |
| 3: VINYL | 1 | 1 |
| 4: GLASS | 1 | 1 |
| 5: CLOTH | 5 | 3 |
| 6: OTHERS | 3 | 3 |

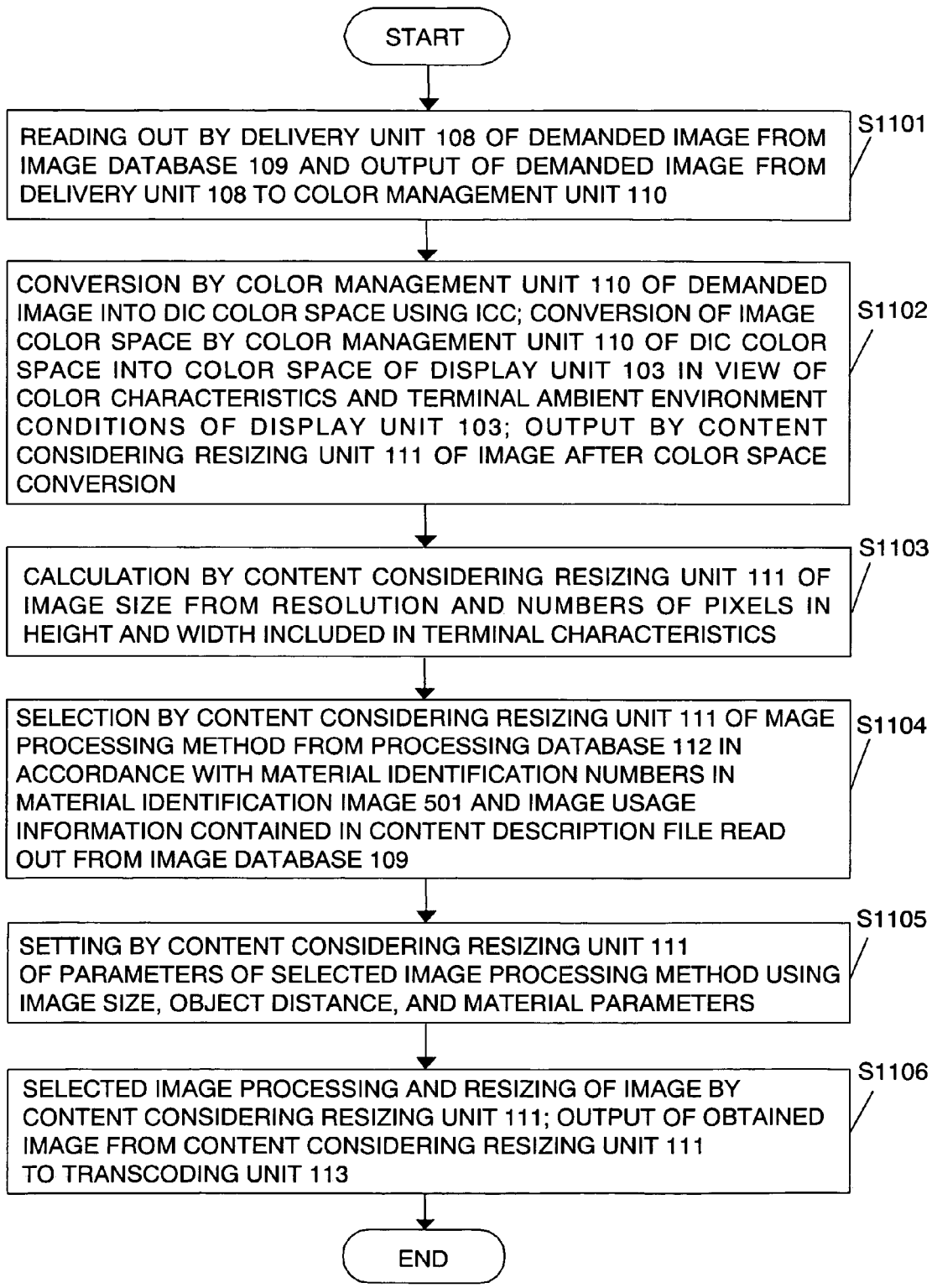

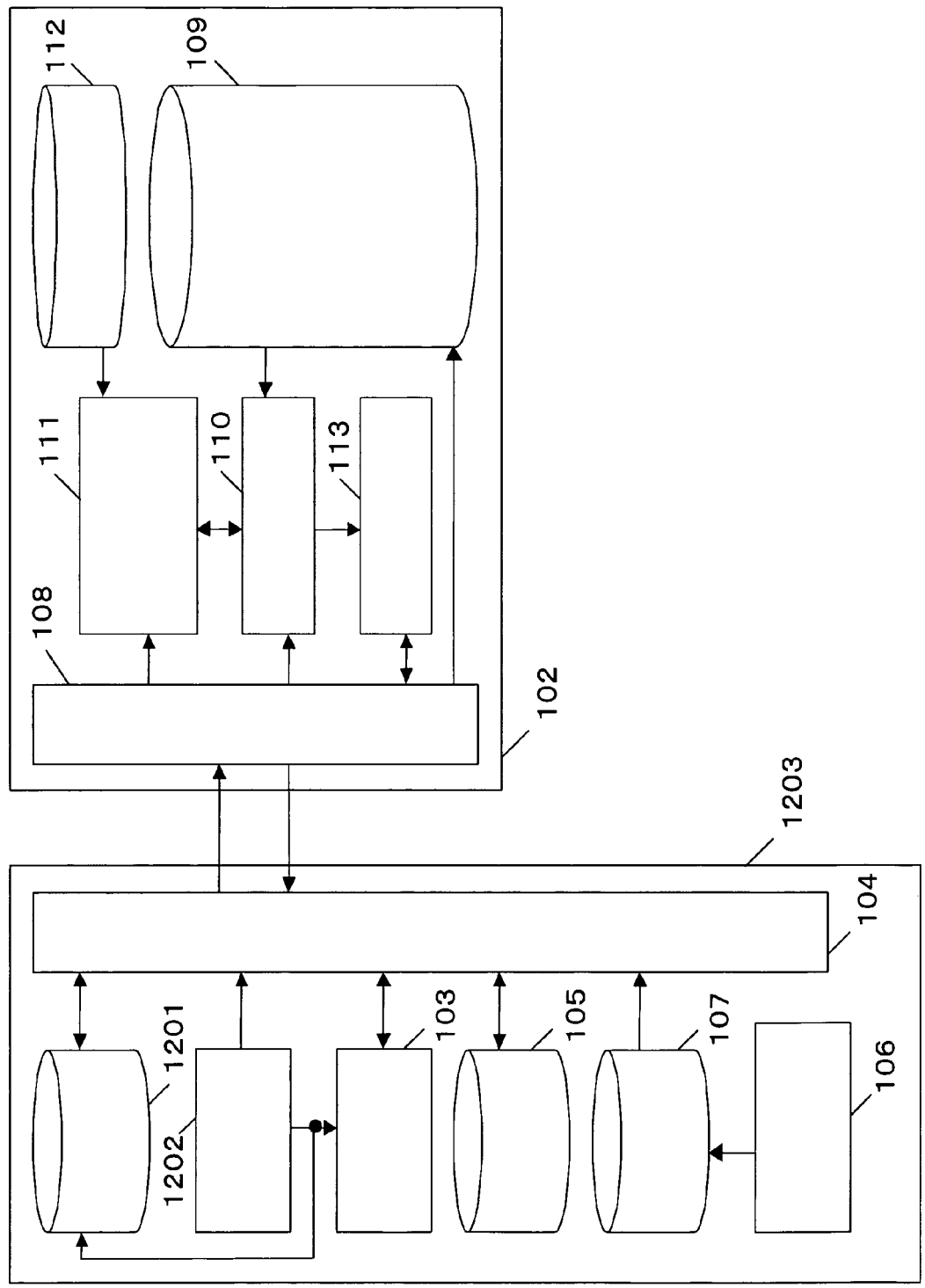

FIG.11

| USER IMAGE PREFERENCE | USER IMAGE DISPLAY HISTORY | USER PROFILE | |
|---|---|---|---|
| USER A<br>CG: TEXTURE EMPHASIS DEGREE: 5<br>NATURAL IMAGE: TEXTURE EMPHASIS DEGREE: 2 | TEXTURE EMPHASIS DEGREE HISTORY OF FIVE LATEST IMAGES<br>CG: 5, 3, 4, 4, 2<br>NATURAL IMAGE: 0, 1, 2, -1, 3 | AGE | 10 |
| | | VISUAL HANDICAP | NONE |
| | | VISUAL POWER | RIGHT 1.5<br>LEFT 1.5 |
| USER B<br>CG: TEXTURE EMPHASIS DEGREE: 4<br>NATURAL IMAGE: TEXTURE EMPHASIS DEGREE: -3 | TEXTURE EMPHASIS DEGREE HISTORY OF FIVE LATEST IMAGES<br>CG: 4, 4, 3, 2, 4<br>NATURAL IMAGE: -1, -4, -2, -5, 0 | AGE | 15 |
| | | VISUAL HANDICAP | NONE |
| | | VISUAL POWER | RIGHT 1.2<br>LEFT 1.3 |
| USER C<br>CG: TEXTURE EMPHASIS DEGREE: -2<br>NATURAL IMAGE: TEXTURE EMPHASIS DEGREE: 1 | TEXTURE EMPHASIS DEGREE HISTORY OF FIVE LATEST IMAGES<br>CG: -4, -2, -1, 0, -1<br>NATURAL IMAGE: 0, 1, 2, -1, 0 | AGE | 20 |
| | | VISUAL HANDICAP | NONE |
| | | VISUAL POWER | RIGHT 1.0<br>LEFT 0.8 |

1001  1002  1003

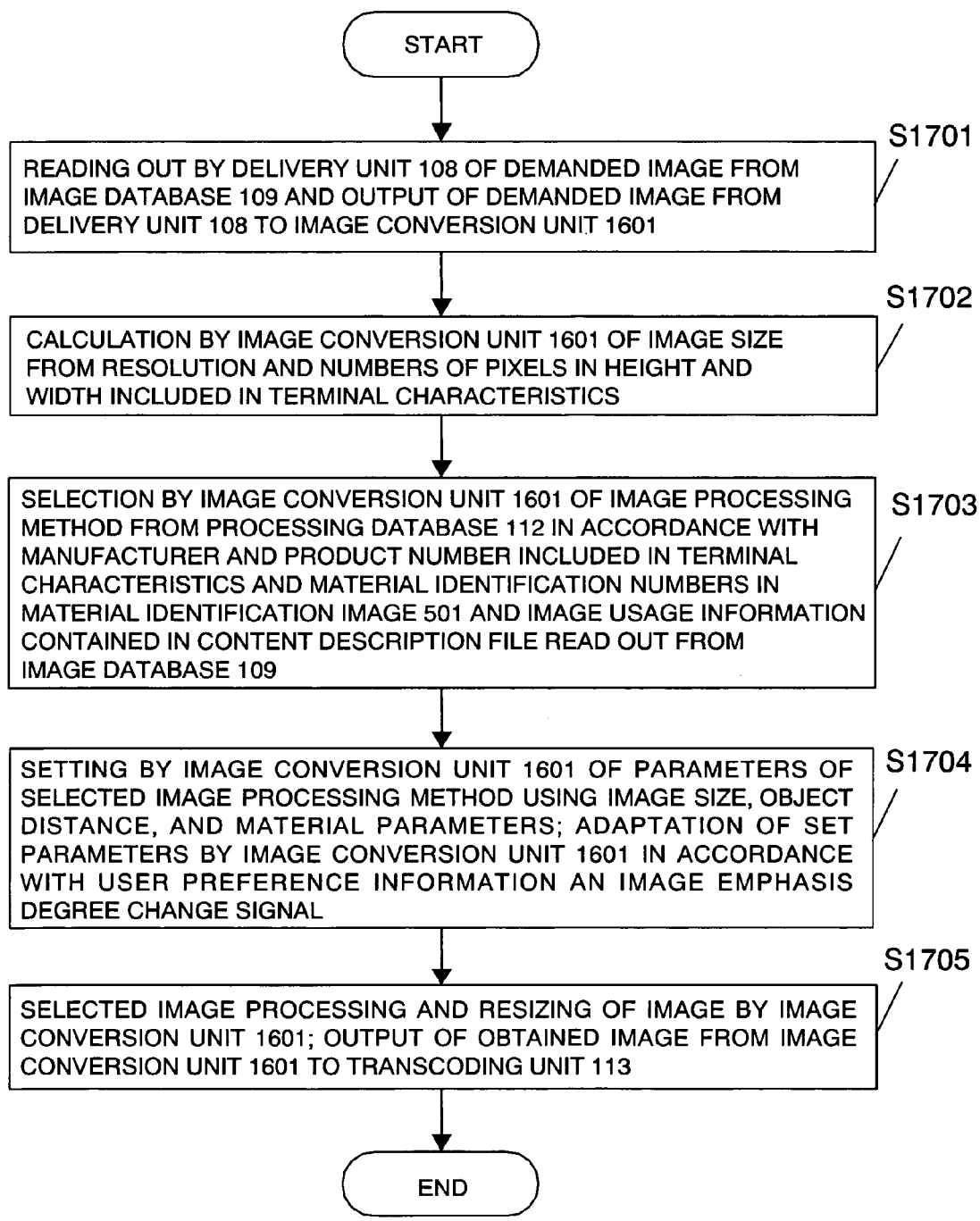

FIG.16

| MANUFACTURER: PRODUCT NUMBER / MATERIAL IDENTIFICATION NUMBER | MANUFACTURER A: A001 | MANUFACTURER B: B001 |
|---|---|---|
| 1: METAL | LUT + GRANULARITY EMPHASIS PROCESSING + GLOSSINESS AND LIGHTNESS EMPHASIS PROCESSING | 3 x 3 MATRIX + GLOSSINESS AND LIGHTNESS EMPHASIS PROCESSING |
| 2: PLASTIC | LUT + GRANULARITY EMPHASIS PROCESSING + GLOSSINESS AND LIGHTNESS EMPHASIS PROCESSING | 3 x 3 MATRIX + GLOSSINESS AND LIGHTNESS EMPHASIS PROCESSING |
| 3: VINYL | GRANULARITY EMPHASIS PROCESSING + IMAGE GAMMA CONVERSION PROCESSING + EDGE EMPHASIS PROCESSING | GRANULARITY EMPHASIS PROCESSING + IMAGE GAMMA CONVERSION PROCESSING + EDGE EMPHASIS PROCESSING |
| 4: GLASS | GRANULARITY EMPHASIS PROCESSING + IMAGE GAMMA CONVERSION PROCESSING | GRANULARITY EMPHASIS PROCESSING |
| 5: CLOTH | LUT + GRANULARITY EMPHASIS PROCESSING + EDGE EMPHASIS PROCESSING | 3 x 3 MATRIX + GRANULARITY EMPHASIS PROCESSING + EDGE EMPHASIS PROCESSING |
| 6: OTHERS | GRANULARITY EMPHASIS PROCESSING + EDGE EMPHASIS PROCESSING | GRANULARITY EMPHASIS PROCESSING + EDGE EMPHASIS PROCESSING |

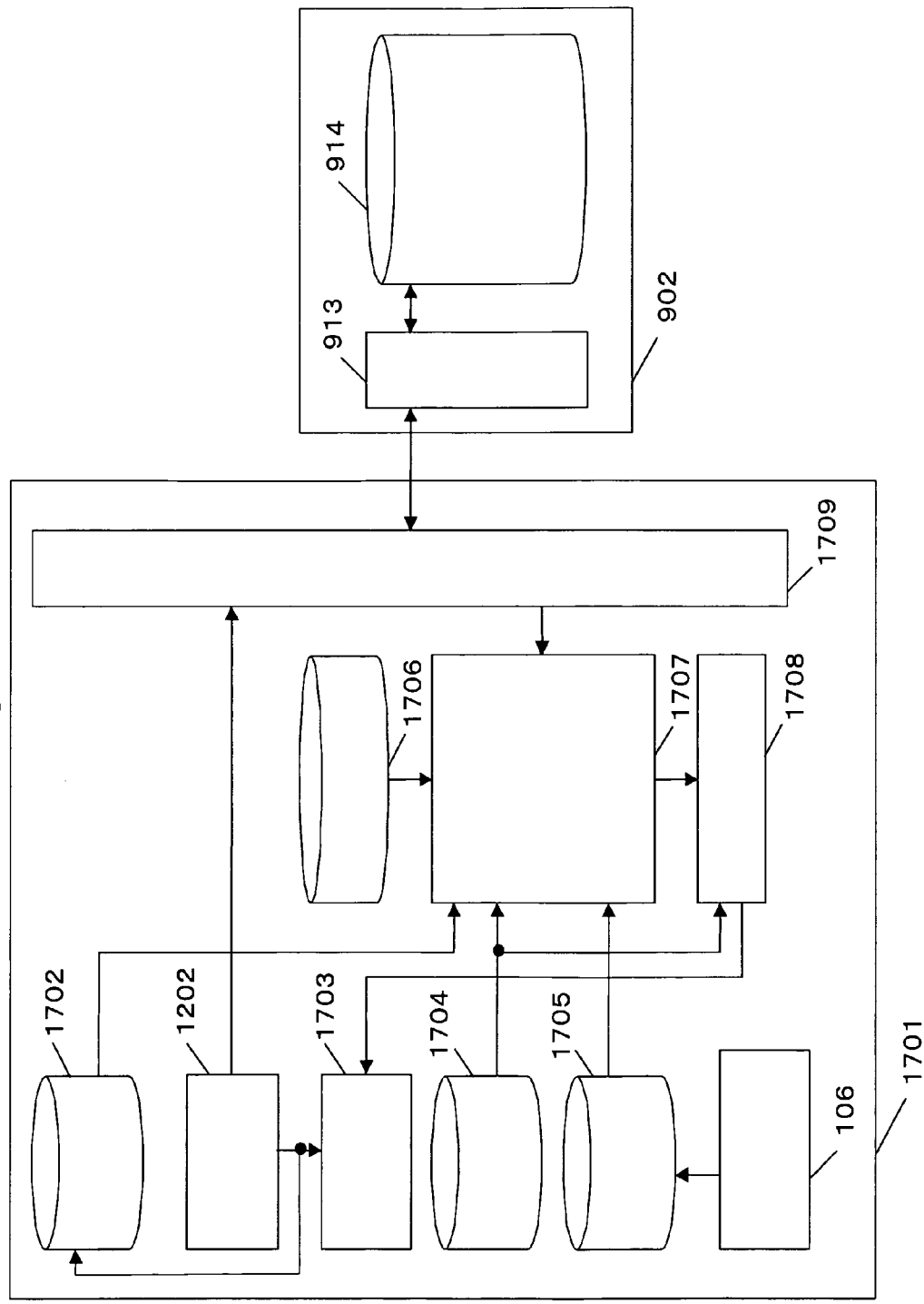

INFORMATION PROCESSING SYSTEM FOR DISPLAYING IMAGE ON INFORMATION TERMINAL

FIELD OF THE INVENTION

The present invention relates to an information processing system which enables optimized display of an image on various displays in the case where the image is delivered to information terminals varied in display, such as a mobile phone.

BACKGROUND OF THE INVENTION

With the popularization of the Internet, the opportunity of delivering a content to various types of information terminals which display information is increasing. Each of the information terminals has a monitor such as a display for a personal computer, television, etc. having a size of 10 inches or more, and a display for a PHS, a personal digital assistant (PDA), etc. having a size of about a several inches, and the like, and the ubiquitous information environment wherein the information is utilized without being conscious of the computer in any place in real life has been created.

Because the information terminals are of great variety and usable applications thereof differ from one another depending on the type of the information terminal, when a content stored in a server is delivered to the information terminals, an error occurs in displaying the information (content) in some cases. Therefore, it is necessary to subject an HTML document to shaping and format conversion, and such technology is called transcoding.

Particularly, in the case of delivering an image to various information terminals, it is necessary to perform a color conversion in accordance with performances such as the number of colors and a resolution of a display of each of the information terminals and, further, to perform an image format conversion which enables the image to be displayed by the application of each of the information terminals. For example, JP-A-2002-108757 proposes a method of image conversion, wherein a content image is reduced in size after being rotated in view of an aspect ratio so that the image is displayed on a screen having a lower resolution such as that of a mobile terminal. Further, as disclosed in JP-A-9-233490, a color management technology wherein a color conversion is performed in accordance only with color characteristics of each of information terminals is known. In the color management, color image data are output after being converted into optimum color image data in such a manner that the color image data input from an input unit such as a camera and a scanner is converted into an independent color space which does not rely on the input unit before being displayed on a display of each of the information terminals.

Since each of these conventional image conversions performed in an information processer consists only of the aspect ratio conversion in accordance with a display of the information terminal, the resolution conversion with respect to a reduction in image size, and the reduction of color number conversion such as a halftone conversion, the image displayed on the monitor having the size of a several inches, such as that of a mobile terminal, is undesirably reduced in quality and texture as compared with the original image accumulated in server, resulting in an indistinct image.

For example, when a fine texture of an object is subjected to a simple resolution reduction, the texture is displayed differently from that observed when the size is the standard size. Further, the above problems are not solved by the conventional color management technology since the technology is oriented only to color characteristics of the display without considering the resolution and so forth.

Also, since the color management technology is used for compensating only the color characteristics of the image input/output unit such as a camera and a display, the technology is not yet capable of outputting exact colors of the original image.

SUMMARY OF THE INVENTION

An object of the invention is to enable, in the case of delivering a content, particularly an image, to information terminals varied in display, such as a mobile phone, each of the information terminals to perform optimum display by adapting the image for each of the displays.

An information display device and an information processer of the invention perform, in the case where a content, particularly an image, is delivered to information terminals such as a mobile phone varied in display, optimum image processing in accordance with performances of a display of each of information terminals and content information including a material and a object distance contained in the image in addition to a framework of a color conversion according to a color management technology.

Also, the information display device and the information processer of the invention are capable of changing parameters of the image processing in accordance with an image preference of a user and an image texture input by the user.

The invention suppresses degradation in quality and texture of an image and displays the image suppressed in difference from colors of the original image on the display of the information terminal.

BRIEF DESCRIPTION OF THE DRAWINGS

FIG. 1 is a block diagram showing a constitution of an information processing system according to a first embodiment of the present invention.

FIG. 2 is a diagram showing an example of description of a terminal characteristic using CC/PP according to the first embodiment of the invention.

FIG. 3 is a diagram showing an example of a description of a tag of an input profile using ICC according to the first embodiment of the invention.

FIG. 4 is a diagram showing an example of material discrimination image according to the first embodiment of the invention.

FIG. 5 is a flowchart showing an operation of a first method of a color management and a content considering resizing according to the first embodiment of the invention.

FIG. 6 is a diagram showing processing detail of a processing database according to the first embodiment of the invention.

FIGS. 7A and 7B are diagrams each showing an example setting of processing parameters according to the first embodiment of the invention.

FIG. 8 is a flowchart showing an operation of a second method of a color management and a content considering resizing according to the first embodiment of the invention.

FIG. 10 is a diagram showing a constitution of an information processing system according to a third embodiment of the invention.

FIG. 11 is a diagram showing a user preference database according to the third embodiment of the invention.

FIG. 15 is a flowchart showing an operation performed by an image conversion unit according to the fifth embodiment of the invention.

FIG. 16 is a diagram showing a processing database according to the fifth embodiment of the invention.

FIG. 17 is a diagram showing a constitution of an information processing system according to a sixth embodiment of the invention.

DESCRIPTION OF THE EXEMPLARY EMBODIMENT

Figure 9:
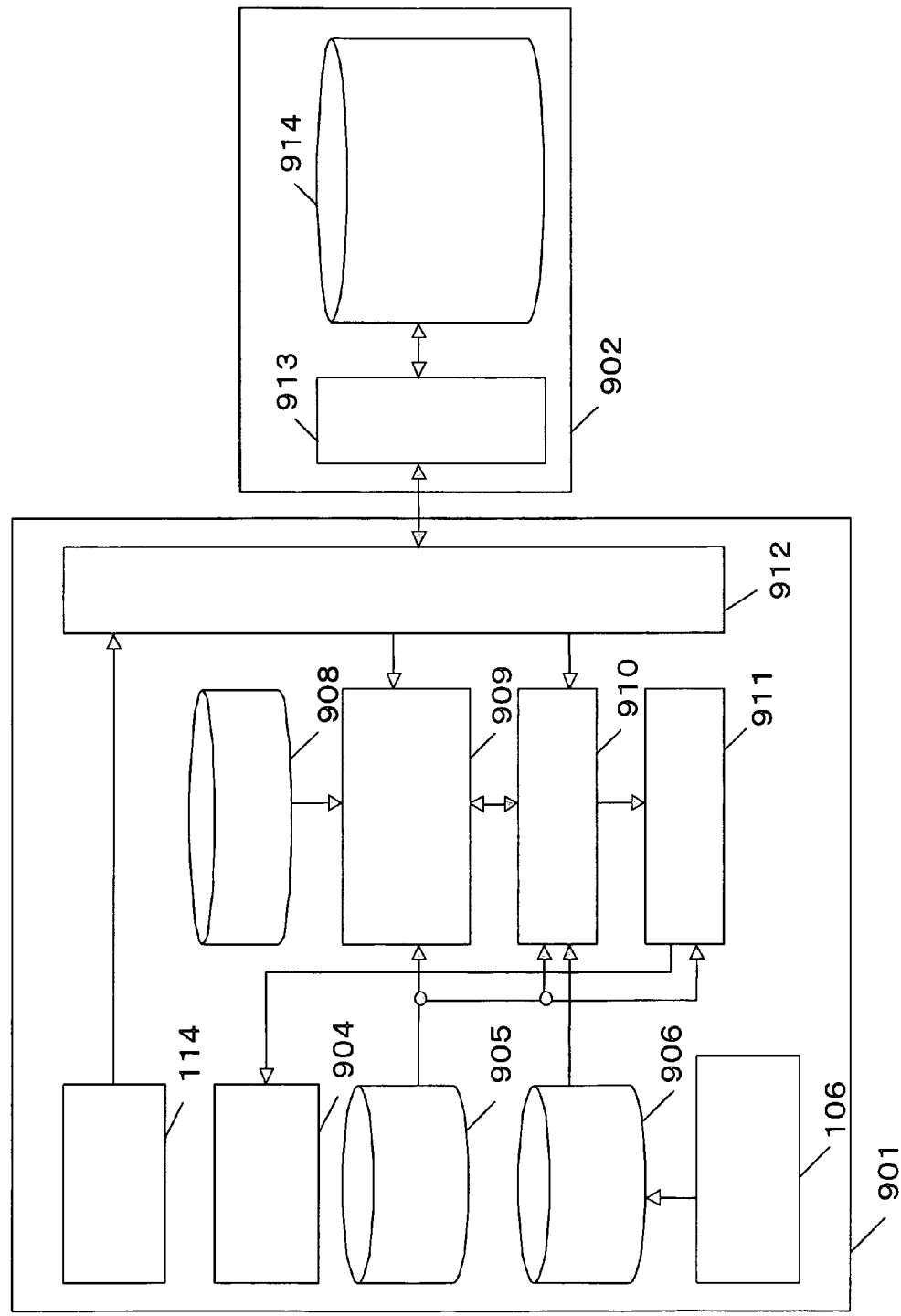
FIG. 9 is a diagram showing a constitution of an information processing system according to a second embodiment of the invention.

Exemplary embodiments of the present invention are demonstrated hereinafter with reference to the accompanying drawings.

1. Fist Exemplary Embodiment

FIG. 1 is a block diagram showing a constitution of an information processing system according to a first embodiment of the invention, the information processing system having an information display device 101 for displaying images and an information processor 102 for generating and delivering images to be displayed on the information display device 101.

The information display device 101 has a display unit 103 for displaying images, an information transmitter receiver unit 104, a terminal ambient environment acquisition unit 106 for measuring terminal ambient environment conditions such as ambient illumination conditions of the information display device 101, a terminal ambient environment database 107 for storing the terminal ambient environment acquired by the terminal ambient environment acquisition unit 106, and a user input unit 114 which is used by a user for designating a demanded image and outputs an image demand signal to the information transmitter receiver unit 104.

The information transmitter receiver unit 104 supervises and performs a process of transmitting to the information processor 102 the image demand signal for demanding an image to be displayed on the display unit 103 from the information processor 102, the terminal characteristics including a manufacturer, a product number, the numbers of pixels in height and width, a resolution, color characteristics, and a usable format of the display unit 103, and the terminal ambient environment conditions and receiving the demanded image delivered in accordance with the image demand signal from the information processor 102. As used herein, the color characteristics included in the terminal characteristics indicate chromaticity of the primary colors and gamma values.

The information processor 102 has a delivery unit 108 for receiving the image demand signal from the information display device 101 and transmitting the demanded image which is generated by the information processor 102, an image database 109, a color management unit 110, a content considering resizing unit 111, a processing database 112 for storing processing contents to be used by the content considering resizing unit 111, and a transcoding unit 113 for converting an original image into a format which is in conformity with the terminal characteristics.

The image database 109 stores various images with each of which a content description file containing information relating to materials displayed on respective regions of the image, a object distance contained in the image, information including a usage of the image, etc. and a color management profile indicating a color conversion technology of the image input device used when converting the image into electric data are stored. The color management unit 110 subjects the original image read out from the image database 109 by means of the image demand signal to color management processing using the color characteristics among the terminal characteristics and the terminal ambient environment conditions. The content considering resizing unit 111 selects an image processing method which differs depending on the content description file attached to the image and decides an image size for delivery by using the resolution and the numbers of pixels in height and width included in the terminal characteristics to perform reduction, enlargement, or equimagnification of the original image of the image database 109 to achieve the image size for delivery.

An operation will hereinafter be described.

The information transmitter receiver unit 104 transmits from client software such as a www browser operating on the information display device 101 the image demand signal, the terminal characteristics, and the terminal environment conditions to the information processor 102 via a network such as the Internet and receives the demanded image from the information processor 102.

In the case where the information display device 101 is of the mobile type, the terminal environment conditions are ever-changing and, therefore, the terminal ambient environment acquisition unit 106 stores the measured terminal ambient environment conditions every time the environment changes or at a predetermined interval in the terminal ambient environment database 107.

In the case where the information display device 101 is of the stationery type such as a desktop personal computer, the terminal ambient environment conditions measured beforehand are stored in the terminal ambient environment database 107.

It is possible to realize the terminal characteristics stored in the terminal characteristics database 105 and the terminal ambient environment conditions stored in the terminal ambient environment database 107 by adding necessary information tags to a technology of attaching information to a http header, such as Cookie and CC/PP (Composite Capability/Preference Profiles).

Shown in FIG. 2 is a description of the terminal characteristics by CC/PP. In addition to the information tags conventionally used for the CC/PP, information tags required for the transmission of terminal characteristics according to the invention such as Gamma, Red Colorant, Green Colorant, Blue Colorant, White Colorant, Luminance, Ambient Illuminant, and the like are attached.

The delivery unit 108 of the information processor 102 obtains the image demand signal, the terminal characteristics, and the terminal ambient environment conditions transmitted from the information display device 101 and instructs the image database 109 to read out the demanded image. Further, the delivery unit 108 transmits the terminal characteristics and the terminal ambient environment conditions of the information display device 101 to the color management unit 110, the content considering resizing unit 111, and the transcoding unit 113.

For example, the delivery unit 108 transmits the color characteristics included in the terminal characteristics and the terminal ambient conditions to the color management unit 110, and transmits the resolution of the display device 101 to the content considering resizing unit 111, as well as transmitting the information relating to the image format to the transcoding unit 113.

The color management unit 110 executes color conversion processing by using the color characteristics included in the terminal characteristics and the terminal ambient environment conditions so that a hue of the image to be displayed on the display unit 103 will be exactly adjusted.

The content considering resizing unit 111 decides a modification size of the demanded image according to the obtained information including the resolution and the numbers of pixels in height and width of the information display device 101 and reads out necessary processings depending on the content description file attached to the image from the processing database 112 so as to execute size conversion processing.

After the color management unit 110 and the content considering resizing unit 111 complete the above processings, the transcoding unit 113 converts the thus-generated demanded image into a format which is adapted for the information display device 101 and transmits the generated demanded image to the delivery unit 108. The delivery unit 108 delivers the generated demanded image to the information display device 101 through the network. The information display device 101 displays the demanded image which has been requested by the user on the display unit 103 via the information transmitter receiver unit 104.

Details of the operations performed by the color management unit 110 and the content considering resizing unit 111 will be described below. Since the color management unit 110 and the content considering resizing unit 111 refer to the substance of the image database 109, the substance of the image database 109 will be described to start with.

To each series of the stored image data, a content description file of the image and an input profile for color management of the image input device used for converting the image into electric data are attached. The color management input profile indicates color characteristics of the image input device which has obtained the image data, and examples of the input profile include a description of the image input device by an ICC profile of ICC (International Color Consortium). The ICC profile contains a profile header of 128 bytes, a tag table, and detailed descriptions of tags contained in the table and can be embedded in the image as binary data.

A part of the color characteristics description by the ICC profile is shown in FIG. 3. The input profile belongs to a tag called A to B-0 tag and has essential entry tags including colorant tags for entry of XYZ tristimulus of three primary colors (red, blue, green), TRC tags for entry of gammas of the three primary colors as one dimensional look up table, and a media white point tag for entry of XYZ tristimulus of white.

The color management unit 110 converts the image based on the ICC profile into a DIC (Device Independent Color Space) color space which is independent from the display unit 103 of the information display device 101. The color space independent from the display unit 103 includes XYZ tristimulus defined by CIE (Color) and JCh (J=brightness, C=chromaticness, h=hue) indicated by a L*a*b* color space and a color appearance model.

The content description file is a file indicating a content of each of images, and included as the content are a material identification image wherein each of regions of the image is represented by a material identification number indicating a material, object distance information indicating a distance to the object, material parameter information including information necessary for the material, and image usage information.

The material identification image 501 is shown in FIG. 4. The material identification image 501 is the image in which material numbers of respective pixels are indicated, and the content considering resizing unit 111 selects processings which vary depending on the pixels in accordance with the material numbers to perform the processings. Each of portions divided by the solid lines corresponds to one pixel, and one material number is given to one pixel.

There are various materials, and, for example, metal is represented by 1, plastic is represented by 2, vinyl is represented by 3, glass is represented by 4, cloth is represented by 5, and others are represented by 6. In addition, the material identification image 501 may be generated by an image recognition unit or may be input manually.

Information relating to an object distance contained in the image is stored as the object distance information. Since textures of the materials are clearly recognized when the object distance is relatively short, the content considering resizing unit 111 performs processing required for outputting an image having a close feel of a material as the real object.

The object distance information may be: measured by using a depth measurement unit called three dimensional scanner; estimated by an image recognition unit such as a stereo image processor; or input depending on a user empirical value.

The material parameter information is parameters indicating characteristics of materials and used when generating a demanded image having a feel of a material close to the original image by the use of the content considering resizing unit 111. In the invention, a granularity $\sigma$ of a texture of a material is used as the representative material parameter information.

The granularity may be obtained by measuring the object by using a stylus meter or may be estimated by information processing. Since the texture of an original image wherein the object distance is short is visually recognized by the user, texture emphasizing processing is performed in a demanded image displayed on the display unit 103 in accordance with the granularity of material and the object distance so as to output an image having a feel of a material closer to the original image as the demanded image.

The image usage information may be a distinction between CG and a natural image or a distinction according to color reproduction methods. The color reproduction methods are a color reproduction adapted for the user preference and a color reproduction faithful to the original image. The usage may be divided strictly into, for example, a medical use, an amusement use, a field use, and so forth.

An operation conducted by the color management unit 110 and the content considering resizing unit 111 will be described below. Two methods are considered for performing the operation. In a first method, the content considering resizing unit 111 executes image processing in the DIC space which is a JCh color space using CIECAM97s which is a color model of CIE. In a second method, the content considering resizing unit 111 executes image processing in a color space of the display unit 103.

The first method will hereinafter be described. A flowchart of the first method is shown in FIG. 5.

In S601, the delivery unit 108 reads out a demanded image from the image database 109 to output the demanded image to the color management unit 110.

In S602, the color management unit 110 converts the image into the DIC color space which is an independent color space using an ICC profile which is a color management input profile attached to the demanded image from the image database 109.

In S603, the content considering resizing unit 111 fetches the resolution and the numbers of pixels in height and width contained in the terminal characteristics from the delivery unit 108 to calculate an image size from the resolution and the demanded image. Enlargement processing is performed when the image size is larger than the original image, and reduction processing is performed when the image size is smaller than the original image. The enlargement processing and the reduction processing are as follows.

In S604, the content considering resizing unit 111 selects the image processing method to be conducted from the processing database 112 in accordance with the material identification numbers of the material identification image 501 and the image usage information contained in the content description file attached to the demanded image which has been read out from the image database 109. Degrees of emphases of the feel of a material to be used in the image processing methods are stored in the processing database 112 and stored as knowledge obtained through subjective evaluation experiments and so forth.

Shown in FIG. 6 is the detail of the processing database 112. The processing database 112 stores various image processing methods which are subject to selection depending on the content description file, and the optimum image processings for the respective contents are stored as knowledge obtained through subjective evaluation experiments which are of engineering approach.

Examples of the image processing methods are granularity emphasis processing, saturation emphasis processing, edge emphasis processing, texture emphasis processing, glossiness and lightness emphasis processing, transparency emphasis processing, color gamut enlargement processing, color gamut reduction processing, image gamma conversion processing, and lightness conversion processing, and one or a combination of the above processings will be selected.

The content considering resizing unit 111 selects one of the material identification numbers of an object in the demanded image from the vertical axis of FIG. 6 and one of the image usages from the horizontal axis to decide the type of image processing. For example, when the selected image usage is the natural image, the granularity emphasis processing for emphasizing a texture representing feel of a material contained in a natural object is set for all the materials.

Since the degree of emphasis of feel of a material of an image in each of the image processing methods is set in the following S605 by using the image size, the object distance information, and the material parameter indicating the granularity, a granularity emphasis for a cloth is different from that for a plastic in texture emphasis degree.

Also, it is possible to vary the emphasis degrees of feel of a material from one another depending on user preference and user input. In the case where the material is a metal or a plastic, the glossiness is crucial and, therefore, the glossiness and lightness emphasizing processing is performed in addition to the granularity emphasizing processing in order to widen a dynamic range of the image. In the case where the material is a plastic or a vinyl, a contrast of the image is emphasized by the gamma conversion of the demanded image, thereby emphasizing the transparency.

In the case where the material is a cloth, the edge emphasis is performed so as to display the rough surface more clearly. In the case where the image usage is CG, the saturation emphasizing processing and emphasizing processing associated with the saturation and the lightness owing to the color gamut enlargement are performed for the overall image irrelevant to the materials.

Foregoing is one of examples of the processing database 112, and it is possible to set various other processings.

In S605, the content considering resizing unit 111 sets parameters of each of the processing methods selected in S604 using the image size calculated in S603 and the object distance information and the material parameter stored in the image database 109.

Shown in FIG. 7 are examples of settings of processing parameters in the edge emphasizing processing and the saturation emphasizing processing. Shown in FIG. 7A are the parameters decided depending on a relationship between a material granularity and an object distance, and shown in FIG. 7B are the parameters decided depending on a relationship between a material identification number and a target image size.

For example, a degree of edge emphasis which is the parameter of the edge emphasizing processing is decided based on object distance information and a granularity of a material. As the object distance is longer and the granularity is lower, a captured texture of the demanded image is more indistinct. However, since the user recognizes the texture of the object by changing the focal point at the same time with instantly recognizing the overall image of the object when the user actually observes a real scene of the object, an appearance of the object in the demanded image can be different from that of the actual object observed by the user.

Accordingly, as the object distance is longer and the granularity is lower, the texture is particularly more strongly emphasized by the edge emphasis in generating the image, thereby enabling to display the image having a feel of a material more similar to that of the object as viewed by the user.

A saturation emphasis degree which is a parameter of the saturation emphasizing processing is decided based on a material and a target image size. Therefore, when the image size is small and the demanded image is subjected to a reduction in size only by a simple subsampling or a resolution conversion, the image to be obtained is indistinct in colors as compared with the user's recognition of the object of the actual observation, and the obtained image will be blurred due to the low resolution to degrade the feel of a material of the image. Accordingly, the saturation emphasis degrees for the small size image and images containing materials which are colorful and glossy such as a cloth and a plastic are increased.

For example, when the object distance is 50 cm and the material granularity is 5 mm, the parameter is 3. When the target image size is 1280 pixels×1024 pixels and the material is a metal, the parameter is 1.

Though the image processing is described in the foregoing as the two dimensional matrix which enables the selection between two factors, the number of factors may be three or more.

For example, the decision may be made by adding the edge emphasis degree of the edge emphasizing processing to the granularity and the object distance indicated in FIG. 7A and by considering the image size indicated in FIG. 7B.

In S606, the content considering resizing unit 111 performs image processing on the demanded image by using the decided image processing method and the parameters and changes the image size of the original image to output the demanded image to the color management unit 110.

In S607, the color management unit 110 converts the color space of the demanded image from the DIC color space into the color space for the display unit 105 in view of the color characteristics and the terminal ambient environment conditions of the display unit 105 of the information display device 101 and outputs the demanded image to the transcoding unit 113.

The above processing enables the demanded image to be converted into the optimum image for the information display device 101. The thus-obtained optimum image is subjected to a format conversion by the transcoding unit 113 and then delivered to the information display device 101 by the delivery unit 108.

Hereinafter, the second method will be described. The color management unit 110 of the information processor 102 performs all the color conversions into the color space for the display unit 105 of the information display device 101, and the content considering resizing unit 111 performs a resize conversion of a demanded image in the color space for the display unit 105.

Process steps of the second method are described with reference to FIG. 8.

In S1101, the delivery unit 108 reads out the demanded image from the image database 109 to output the demanded image to the color management unit 110.

In S1102, the color management unit 110 converts the demanded image into a DIC color space using an input device profile (ICC) and then converts the DIC color space into the color space for the display unit 105 using the color characteristics and the terminal ambient environment conditions of the output display in the same manner as in the first method to output the demanded image to the content considering resizing unit 111.

In S1103, the content considering resizing unit 111 fetches from the delivery unit 108 the resolution and the numbers of pixels in height and width included in the terminal information to calculate an image size from the resolution and the demanded image size. Enlargement processing is performed when the image size is larger than the original image, and reduction processing is performed when the image size is smaller than the original image. The enlargement processing and the reduction processing are as follows.

In S1104, the content considering resizing unit 111 selects the image processing methods to be performed on respective regions of the image among those stored in the processing database 112 in accordance with the material identification numbers of the material identification image 501 and the image usage information contained in the content description file read out from the image database 109. The substance of the processing database are the same as those of the first method.

In S1105, the content considering resizing unit 111 sets parameters for the image processing methods selected in S1104 by using the image size calculated in S1103 and the object distance information and the material parameters stored in the image database 109. The method of setting the processing parameters is the same as that of the first method.

In S1106, by using the thus-set processings and parameters of the processings, image processing is performed on the demanded image to change the image size.

In S1107, the demanded image after the image processing is output to the transcoding unit 113.

The above process steps enable the demanded image to be converted into the optimum image for the information display device 101. The thus-obtained optimum image is subjected to a format conversion by the transcoding unit 113 and then delivered to the information display device 101 by the delivery unit 108.

In this embodiment, the image database 109 can be disposed outside the information processor 102 or an external image database may be used as the image database 109.

According to this embodiment described in the foregoing, in the case of delivering an image to information display devices 101 varied in display including mobile phones, the optimum image conversion processing in accordance with the performance of the display unit 103 of each of the information display devices 101 and the content description file such as a material and a distance of the object is performed in addition to the framework of color conversion of the conventional color management, so that the image is optimized without deteriorations in image quality and feel pf a material and discrepancy of color.

2. Second Exemplary Embodiment

FIG. 9 is a block diagram showing a constitution of an information processing system according to a second embodiment of the invention. Though the information processor 102 performs the image processing in the first embodiment described with reference to FIG. 1, image processing in this embodiment is performed in an information display device 901.

Referring to FIG. 9, the information display device 901 has a user input unit 114, a display unit 904, a terminal characteristics database 905, a terminal ambient environment database 906, a terminal ambient environment acquisition unit 106, a color management unit 910, a content considering resizing unit 909, a processing database 908, a transcoding unit 911, and an information transmitter receiver unit 912. An information provider device 902 for providing an image has a delivery unit 913 and an image database 914.

When a user inputs an image demand signal from the user input unit 114, the information transmitter receiver unit 912 receives the image demand signal from the user input unit 114 to output the image demand signal to the information provider device 902. The delivery unit 913 of the information provider device 902 outputs the image demand signal which has been input from the information display device 901 to the image database 914, so that a demanded image corresponding to the image demand signal is output from the image database 914 to the information transmitter receiver unit 912 via the delivery unit 913.

The information transmitter receiver unit 912 inputs the demanded image to the color management unit 910. To the color management unit 910, terminal characteristics and terminal ambient environment conditions are input from the terminal characteristics database 905 and the terminal ambient environment database 906.

The terminal characteristics and an image processing method adapted for the terminal characteristics are input from the terminal characteristics database 905 and the processing database 908 to the content considering resizing unit 909.

The terminal characteristics are input from the terminal characteristics database 905 to the transcoding unit 911 so that a demanded image after being subjected to the image processing is output to the display unit 904.

Since other parts of the operation are the same as those of the first embodiment described with reference to FIG. 1, descriptions thereof are omitted.

3. Third Exemplary Embodiment

In the first embodiment, the emphasis degree of an image in the content considering resizing unit 111 is set based on the parameter settings stored in the processing database 112. Described in this embodiment is an information processing system for changing the image emphasis degree in accordance with user preference information transmitted from the information display device and information input by the user.

Shown in FIG. 10 is a constitution of the information processing system according to the third embodiment of the invention. Difference between FIG. 1 and FIG. 10 is in that a user preference database 1201 for storing user preference information including a user's preference, an image display history, a user's age, and an existence of a visual handicap, and visual power and a user input unit 1202 having a function of inputting an image emphasis degree change signal indicating a change in image emphasis degree performed by the user are provided in the constitution of FIG. 10.

An operation of the information display device 1203 shown in FIG. 10 will hereinafter be described. The information transmitter receiver unit 104 outputs an image demand signal for demanding an image to be displayed on the display unit 103, terminal characteristics stored in the terminal characteristics database 105, terminal ambient environment conditions stored in the terminal ambient environment database 107, user preference information relating to a user preference and so forth stored in the user preference database 1201, and an image emphasis degree change signal for deciding an image emphasis degree from an image quality including a granularity, a transparency, and glossiness inputted by the user using the user input unit 1202 to the information processor 102 through a network such as the Internet.

A substance of the user preference database 1201 is shown in FIG. 11. The substance consists of information including a user image preference 1001 which is the image emphasis degree designated by the user, a user image display history 1002 which is a history of image emphasis degrees of images heretofore displayed, and a user profile 1003. A maximum value and a minimum value of the image emphasis degree are 5 and −5, i.e., the image emphasis degree is indicated by using the eleven levels.

As used herein, the user image preference 1001 is the information indicating image preferences of users, and, for example, a user A desires to emphasize a feel of a material of computer graphics (CG) so that a CG image emphasis degree of the user A is set to 5 while a image emphasis degree of a natural image is set to 2 for slightly emphasizing the natural image.

The user image display history indicates image emphasis degrees of heretofore displayed images according to the types of the images, and the user A has the history of the CG image emphasis degrees of 5, 3, 4, 4, and 2 as well as the natural image emphasis degrees of 0, 1, 2, −1, and 3. When the user changes the image emphasis degrees of a displayed image, the image emphasis degrees after the change is indicated as the history.

The user profile 1003 is the information including a user's age, an existence of a visual handicap, and visual power. The user A has the age of 10, is free from visual handicap, and has the visual power of 1.5 (right eye) and 1.5 (left eye).

Figure 12:
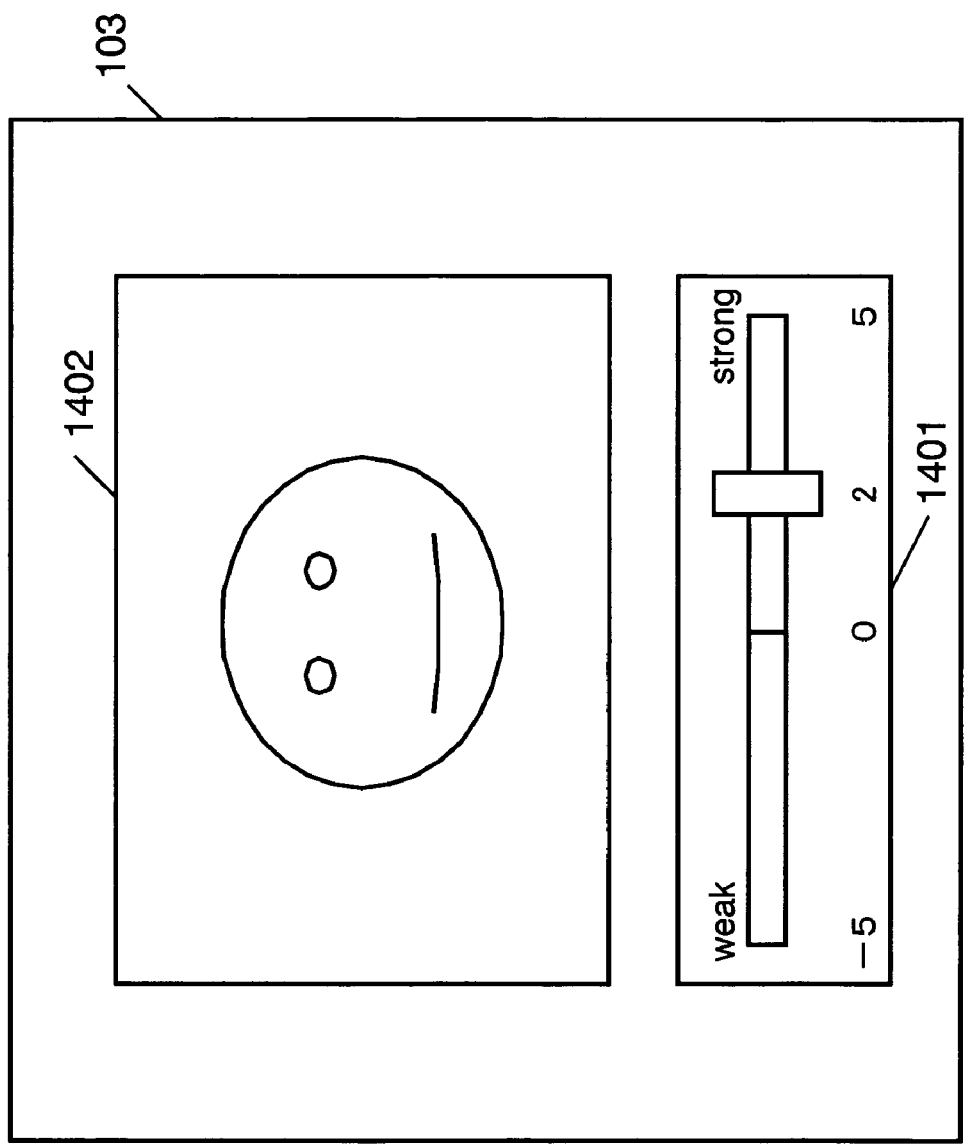
FIG. 12 is a diagram showing a user input unit according to the third embodiment of the invention.

The user input unit 1202 will hereinafter be described. Shown in FIG. 12 is a diagram showing an image emphasis degree input from the user input unit 1202 and displayed on the display unit 103.

A demanded image 1402 and an emphasis display unit 1401 for representing an image emphasis degree are displayed on the display unit 103, and it is possible to change the emphasis degree of the demanded image 1402 using the user input unit 1202. The change in image emphasis degree is output as an image emphasis degree change signal from the user input unit 1202 to the information processor 102 via the information transmitter receiver unit 104.

A plurality of the emphasis degree input units 1401 may be set so that the emphasis degree input units respectively indicate senses such as a granularity, a transparency, and a glossiness, or a single emphasis degree input unit 1401 may be set as one image emphasis degree. The values of the image emphasis degrees may be used by the content considering resizing unit 111 which is described later in this specification. The image emphasis degree change signal is stored as the user history in the user preference database 1201.

It is possible to realize the information transmitter receiver unit 104 in the same manner as in the first embodiment by, for example, adding necessary information tags to a technology of attaching information to an http header of Cookie, CC/PP, and the like, and the necessary information tags may be those equivalent to the user preference information and the image emphasis degree change signal.

Since the display unit 103, the terminal characteristics database 105, the terminal ambient environment database 107, and the terminal ambient environment acquisition unit 106 operate in the same manner as those described in the first embodiment, detailed descriptions thereof are omitted.

Hereinafter, an operation process of the information processor 102 will be described.

The operation of this embodiment is conducted by the content considering resizing unit 111, which is different from the first embodiment. The delivery unit 108, the color management unit 110, the image database 109, the processing database 112, and the transcoding unit 113 perform operations same as those of the first embodiment, and, therefore, descriptions therefore are omitted.

The image emphasis in the content considering resizing unit 111 in the first embodiment is performed based on the parameter settings stored in the processing database 112. In turn, in this embodiment, the image emphasis degree is changed in accordance with the user preference information and the image emphasis degree change signal which are transmitted from the information display device 1203.

More specifically, the parameter values read out from the processing database 112 are changed by using the substance of the user preference database 1201 shown in FIG. 11 and the image emphasis degree change signal.

For example, the parameter values to be used for image processing are changed in accordance with the user profile 1003 indicating the age, the presence of visual handicap, and the visual power. When the user has an advanced age, a contrast ratio of an image is reduced to reduce a load on the eyes, and, when the user has inferior visual power, parameters for performing image processing for emphasizing an outline of an image are set.

In the case where a positive value is input in accordance with the image emphasis change signal in the user image display history 1002, a parameter to be used for image processing is increased in value. When a negative value is input, a parameter to be used for image processing is reduced in value.

The image database 109 may be disposed outside the information processor 102 or an external image database may be used as the image database 109.

According to this embodiment described in the foregoing, in the case of displaying an image on a display unit 103 of an information display device, the optimum image processing is performed in accordance with the user's preference and the image emphasis degree change signal inputted by the user in addition to the terminal characteristics and the content description file, thereby providing the image which has suppressed degradation in image quality and a feel of material and is in accordance with the user's preference.

4. Fourth Exemplary Embodiment

Figure 13:
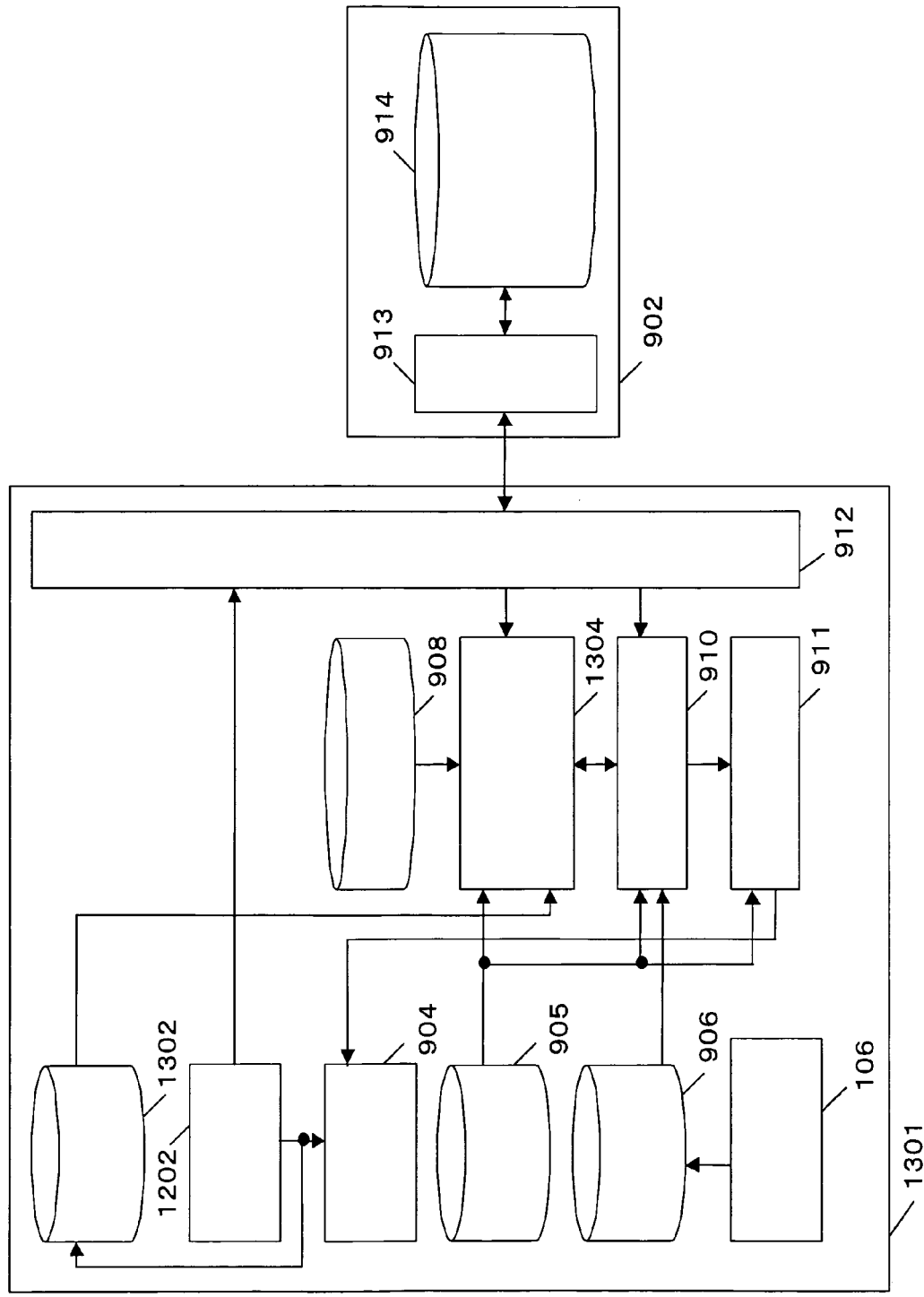
FIG. 13 is a diagram showing a constitution of an information processing system according to a fourth embodiment of the invention.

FIG. 13 is a block diagram showing a constitution of an information processing system according to a fourth embodiment of the invention. Though the information processor 102 performs the image processing in the third embodiment which is described with reference to FIG. 10, image processing in this embodiment is performed in an information display device 1301.

Referring to FIG. 13, the information display device 1301 performing the image processing has a user preference database 1302, a user input unit 1202, a display unit 904, a terminal characteristics database 905, a terminal ambient environment database 906, a terminal ambient environment acquisition unit 106, a color management unit 910, a content considering resizing unit 1304, a processing database 908, a transcoding unit 911, and an information transmitter receiver unit 912. An information provider device 902 for providing images has a delivery unit 913 and an image database 914.

When a user inputs an image demand signal from the user input unit 1202, the information transmitter receiver unit 912 receives the image demand signal from the user input unit 1202 and outputs the image demand signal to the information provider device 902. The delivery unit 913 of the information provider device 902 outputs the image demand signal which has been input from the information display device 901 to the image database 914, and a demanded image corresponding to the input image demand signal is output from the image database 914 to the information transmitter receiver unit 912 via the delivery unit 913.

The information transmitter receiver unit 912 inputs the demanded image to the color management unit 910. To the color management unit 910, terminal characteristics and terminal ambient environment conditions are input from the terminal characteristics database 905 and the terminal ambient environment database 906.

To the content considering resizing unit 1304, the terminal characteristics, a user image preference 1001, a user image display history 1002, and a user profile 1003, and an image processing method which is adapted for the terminal characteristics are input from the terminal characteristics database 905, a user preference database 1302, and the processing database 908.

The terminal characteristics are input from the terminal characteristics database 905 to the transcoding unit 911, and the transcoding unit 911 outputs the demanded image after being subjected to the image processing to the display unit 904.

Since other parts of the operation are the same as those described in the third embodiment, descriptions thereof are omitted.

5. Fifth Exemplary Embodiment

In the first and the third embodiments, the color conversion owing to the color management is performed in such a manner that the color management unit 110 of the information processor 102 performs the color conversion of the framework by the color management system and the content considering resizing unit 111 performs the reduction and enlargement of the image. In an information processing system of this embodiment, the color management processing is eliminated by storing optimum image processing methods for information display devices in a processing database.

Figure 14:
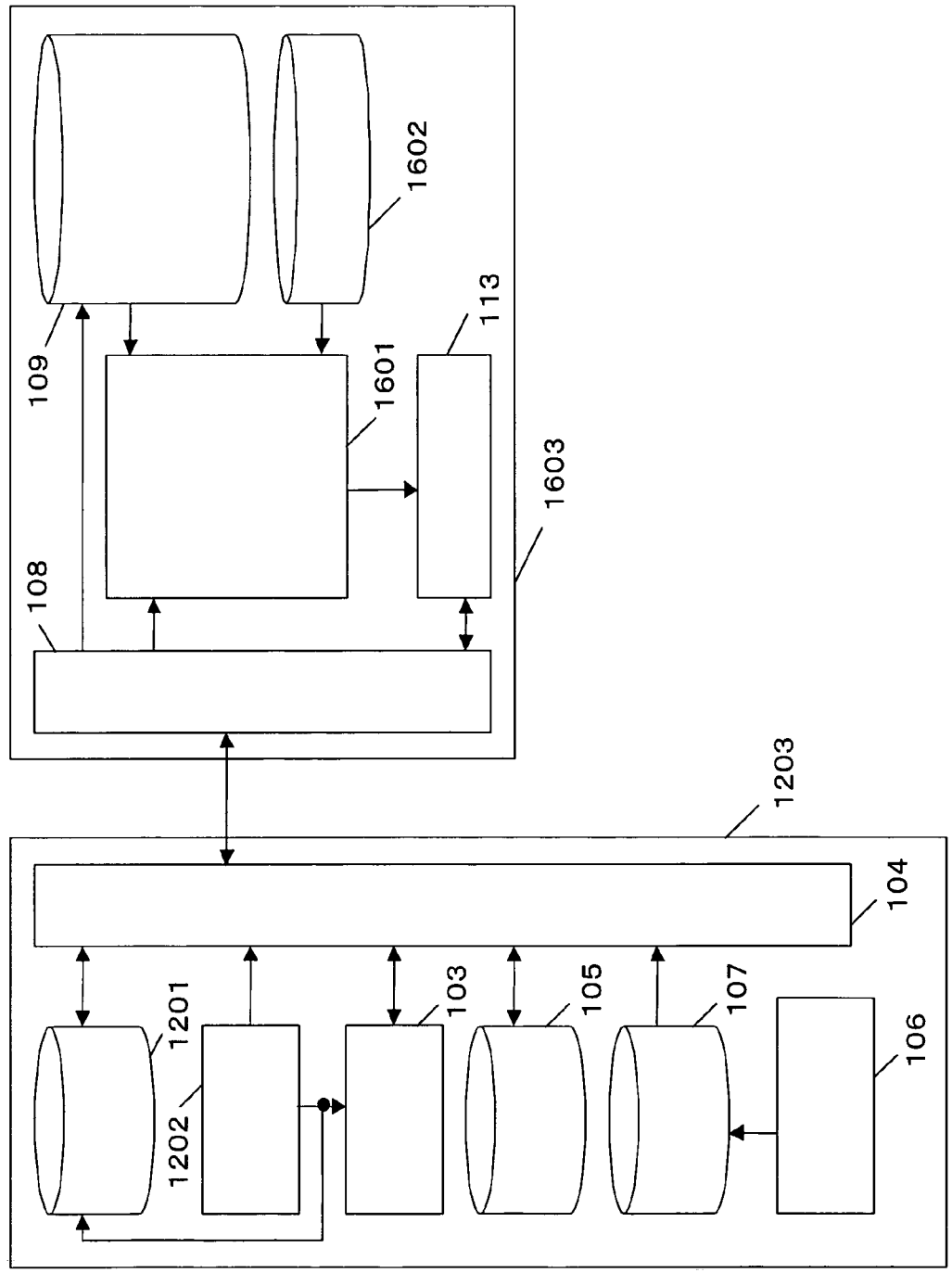
FIG. 14 is a diagram showing a constitution of an information processing system according to a fifth embodiment of the invention.

Shown in FIG. 14 is a constitution of the information processing system according to this embodiment.

Referring to FIG. 14, the information display device 1203 has a constitution which is the same as the third embodiment, and, therefore, description thereof is omitted. An information processor 1603 has a delivery unit 108, an image conversion unit 1601, a transcoding unit 113, an image database 109, and a processing database 1602. Since constitutions of the delivery unit 108, the transcoding unit 113, and the image database 109 are the same as those shown in FIG. 1 or 10, descriptions thereof are omitted.

The image conversion unit 1601 performs image processing on an image which is demanded by the information display device 1203 and read out from the image database 109 based on terminal characteristics, terminal ambient environment conditions, a content description file, and user preference information. The processing database 1602 stores processing item to be used by the image conversion unit 1601.

An operation of the information processor 1603 will hereinafter be described.

The delivery unit 108 instructs the image database 109 to read out the demanded image based on the image demand signal, the terminal characteristics, and the terminal ambient environment conditions input from the information display device 1203 and then outputs the terminal characteristics and the terminal ambient environment conditions of the information display device 101 to the image conversion unit 1601, followed by outputting an image format to the transcoding unit 113.

The image conversion unit 1601 decides an image size of an image to be generated based on the obtained resolution and numbers of pixels in height and width of the display unit 103 of the information display device 1203 and reads out necessary processing from the processing database 1602 depending on the content description file, the terminal characteristics, the terminal ambient environment conditions, and the user preference information, thereby executing the image processing.

The transcoding unit 113 converts the obtained image into a format which suits the information display device 1203 and transmits the image to the delivery unit 108.

The delivery unit 108 outputs the demanded image which has been subjected to the image processing via a network.

Details of operations of the image conversion unit 1601 and the processing database 1602 will be described with reference to FIG. 15.

Shown in FIG. 15 is an operation flow of the image conversion unit 1601.

In S1701, the delivery unit 108 reads out the demanded image from the image database 109 to output the demanded image to the image conversion unit 1601.

In S1702, the image conversion unit 1601 calculates an image size after the image processing from the resolution and the numbers of pixels in height and width included in the terminal characteristics.

In S1703, the image conversion unit 1601 selects from the processing database 1602 an image processing method to be performed on the demanded image based on a manufacturer name and a product number which are included in the terminal characteristics and material identification numbers of a material identification image 501 which are included in the contents description file read out from the image database 109. A substance of the processing database 1602 is shown in FIG. 16.

The processing database 1602 stores the suitable image processing methods which can be obtainable from the manufacturer name and the product number of the display unit 103 included in the terminal characteristics. These image processing methods are knowledge which is obtained beforehand by subjective evaluation experiments and so forth using the display unit 103. LUT and 3×3 matrix are included in the image processing methods, and optimized values of LUT and the matrix are separately stored in the information display device 1203. For example, LUT, granularity emphasizing processing, and glossiness and lightness emphasizing processing are performed in the case of a manufacturer name of company A, a product number of A001, and a material identification number of 1 (metal).

Also, instead of the above described methods, it is possible to select an image processing method using a color temperature and a gamma curve value of the display unit 103 in such a manner that parameters are selected depending on the color temperature and the gamma curve value of the display unit 103 or the parameters may be selected depending on the two or more factors.

In S1704, parameters of the selected image processing method are set by using the manufacturer name and the product number of the display unit 103, the object distance information, and the material parameters, and then the obtained parameters are adapted for the user by using the user preference information and the image emphasis degree change signal.

In S1705, the selected image processing is performed, and the demanded image is resized, so that the demanded image after the resizing is output to the transcoding unit 113.

The image database 109 may be disposed outside the information processor 1603 or an external image database may be used as the image database 109.

According to this embodiment described in the foregoing, in the case where the information processor 1603 outputs a demanded image to information display units 1203 varied in display, the batch optimum image conversion processing including the color processing and the image-plane processing is performed depending on the performance of the display unit of each of the information display devices 1203 and the content information such as the material and the distance of the object, thereby suppressing degradation in image quality and feel of a materail and providing the image free from discrepancy of color.

6. Sixth Exemplary Embodiment

FIG. 17 is a block diagram showing a constitution of an information processing system according to a sixth embodiment of the invention. Though the image processing is performed in the information processor 1203 in the fifth embodiment described with reference to FIG. 14, image processing in this embodiment is performed in an information display device 1701.

Referring to FIG. 17, the information display device 1701 performing the image processing has a user preference database 1702, a user input unit 1202, a display unit 1703, a terminal characteristics database 1704, a terminal ambient environment database 1705, a terminal ambient environment acquisition unit 106, an image conversion unit 1707, a processing database 1706, a transcoding unit 1708, and an information transmitter receiver unit 1709. An information provider unit 902 has a delivery unit 913 and an image database 914.

When a user inputs an image demand signal from the user input unit 1202, the information transmitter receiver unit 912 receives the image demand signal from the user input unit 1202 to output the image demand signal to the information provider device 902. The delivery unit 913 of the information provider device 902 outputs to the image database 914 the image demand signal which has been input from the information display device 901, and a demanded image corresponding to the image demand signal is output from the image database 914 to the information transmitter receiver unit 1709 via the delivery unit 913.

The information transmitter receiver unit 1709 inputs the demanded image to the image-conversion unit 1707. To the image conversion unit 1707, a user image preference 1001, a user image display history 1002, and a user profile 1003 are input from the user preference database 1702; terminal characteristics are input from the terminal characteristics database 1704; and terminal ambient environment conditions are input from the terminal ambient environment database 1705.

The terminal characteristics are input also to the transcoding unit 1708 from the terminal characteristics database 1704, and the transcoding unit 1708 outputs the demanded image after being subjected to the image processing to the display unit 1703.

Since other parts of the operation are the same as those of the fifth embodiment described with reference to FIG. 14, descriptions thereof are omitted.

What is claimed is:

1. An information display device comprising a content considering resizing unit and a display unit for displaying an image, wherein the content considering resizing unit selects a combination of image processing methods for the image based on a content description file containing information relating to materials contained in the image, an object distance contained in the image, and a usage of the image; decides parameters of the selected combination of image processing methods using a target image size of the image and the content description file; and changes a size of an image obtained after image processing by the combination of image processing methods for which the parameters are adjusted into the target image size; and the display unit displays the image after the change in size to the target image size.

2. The information display device according to claim 1, further comprising a user preference database for storing user preference information containing at least one of a user preference, an image display history, a user's age, a presence of visual handicap, and visual power, wherein the parameters of the selected combination of image processing methods are decided by also using the user preference information.

3. The information display device according to claim 1, further comprising a user input unit for outputting an image emphasis degree change signal which is a signal indicating a feel of a material in an image input by a user, wherein
the parameters of the selected combination of image processing methods are decided by also using the image emphasis degree change signal.

4. The information display device according to claim 1, further comprising:
a terminal ambient environment acquisition unit for measuring terminal ambient environment conditions indicating ambient illumination conditions of the display unit; and
a terminal ambient environment database for storing the terminal ambient environment conditions, wherein
the parameters of the selected combination of image processing methods are decided by also using the terminal ambient environment conditions.

5. The information display device according to claim 1, further comprising:
a terminal characteristics database for storing terminal characteristics which are information including a manufacturer, a product number, numbers of pixels in height and width, a resolution, color characteristics, and a usable format of the display unit, wherein
the parameters of the selected combination of image processing methods are decided by also using the terminal characteristics.

6. The information display device according to claim 1, further comprising:
a color management unit and a transcoding unit, wherein
the color management unit uses a color management profile of an image input unit for reading a image to convert color information of the image into an independent color space independent from the image input unit and the display unit and further converts a color space of the image after the image processing by the combination of image processing methods into a color space of the display unit;
the transcoding unit converts into a predetermined format the image after the image processing by the combination of image processing methods and the color space conversion;
the content considering resizing unit outputs the image after the conversion into the independent color space and the image processing by the combination of image processing methods to the color management unit; and
the display unit displays the image after the conversion into the predetermined formant.

7. The information display device according to claim 6, wherein
the color management unit converts the image after the image processing by the combination of image processing methods into the color space of the display unit by using the color characteristics and the terminal ambient environment conditions of the display unit.

8. An information processor comprising a content considering resizing unit, wherein
the content considering resizing unit selects a combination of image processing methods for an image according to a content description file containing information including a material contained in the image, an object distance contained in the image, and a usage of the image; decides parameters of the selected combination of image processing methods using a target image size of the image and the content description file; and changes a size of an image obtained after image processing by the combination of image processing methods for which the parameters are adjusted into the target image size.

9. The information processor according to claim 8, wherein
the parameters of the selected combination of processing methods are decided by also using user preference information containing at least one of a user preference, an image display history, a user's age, a presence of visual handicap, and visual power.

10. The information processor according to claim 8, wherein
the parameters of the selected combination of processing methods are decided by also using an image emphasis degree change signal indicating a feel of material of an image input by the user.

11. The information processor according to claim 8, wherein
the parameters of the selected combination of processing methods are decided by also using terminal ambient environment conditions indicating ambient illumination conditions of the display unit for displaying the image.

12. The information processor according to claim 8, wherein
the parameters of the selected combination of processing methods are decided by also using terminal characteristics which are information containing a manufacturer, a product number, numbers of pixels in height and width, a resolution, color characteristics, and a usable format.

13. The information processor according to claim 8, further comprising:
a color management unit and a transcoding unit, wherein
the color management unit uses a color management profile of an image input unit for reading an image to convert color information of the image into an independent color space independent from the image input unit and the display unit and further converts a color space of the image after the image processing by the combination of image processing methods into a color space of the display unit;
the transcoding unit converts into a predetermined format the image after the image processing by the combination of image processing methods and the color space conversion; and
the content considering resizing unit outputs the image after the conversion into the independent color space and the image processing by the combination of image processing methods to the color management unit.

14. The information processor according to claim 13, wherein
the color management unit converts the image after the image processing by the combination of image processing methods into the color space of the display unit by using the color characteristics and the terminal ambient environment conditions of the display unit.

15. An information processing system comprising:
an information display device; and
an information provider device having an image database in which images each containing a content description file are accumulated, wherein
the information display device has a content considering resizing unit and a display unit for displaying an image, the content considering resizing unit selecting a combination of image processing methods for the image according to a content description file containing information including a material contained in the image, an object distance contained in the image, and a usage of the image; deciding parameters of the selected combination of image processing methods using a target image size of the image and the content description file; and changing a size of an image obtained after image processing by the combination of image processing methods for which the parameters are adjusted into the target image size, and the display unit displaying the image after the change in size to the target image size.

16. An information processing system comprising:

an information processor; and an information display device including a display unit for displaying an image; wherein the information processor has a content considering resizing unit, the content considering resizing unit selecting a combination of image processing methods for the image according to a content description file containing information including a material contained in the image, an object distance contained in the image, and a usage of the image; deciding parameters of the selected combination of image processing methods using a target image size of the image and the content description file; and changing a size of an image obtained after image processing by the combination of image processing methods for which the parameters are adjusted into the target image size.

17. An information display device comprising:

a display unit for displaying an image;

a terminal ambient environment acquisition unit for measuring terminal ambient environment conditions indicating ambient illumination conditions of the display unit;

a terminal ambient environment database for storing the terminal ambient environment conditions;

a user input unit to be used by a user for designating a demanded image which is an image to be displayed on the display unit, the user input unit outputting an image demand signal which is a signal for demanding the demanded image;

a terminal characteristics database for accumulating terminal characteristics which are information including a manufacturer, a product number, numbers of pixels in height and width, a resolution, color characteristics, and a useable format; and an information transmitter receiver unit for transmitting the terminal characteristics, the terminal ambient environment conditions, and the image demand signal and receiving the demanded image which is adapted for the display unit in accordance with the terminal characteristics and the terminal ambient environment conditions.

18. The image display device according to claim 17, further comprising a user preference database for storing user preference information containing least one of a user preference, an image display history, a user's age, presence of visual handicap, and visual power, wherein the user input unit outputs also the user preference information which is input by the user to the user preference database;

the information transmitter receiver unit transmits also the user preference information to receive the demanded image adapted for the display unit including the user preference information.

19. The image display device according to claim 17, wherein the user input unit outputs also an image emphasis degree change signal which is a signal indicating feel of material of a demanded image input by the user to the information transmitter receiver unit; and the information transmitter receiver unit transmits also the image emphasis degree change signal to receive a demanded image adapted in view of the image emphasis degree change signal for the display unit.

20. The image display device according to claim 17, further comprising:

a processing database storing a combination of image processing methods which is decided according to the terminal characteristics and the terminal ambient environment conditions;

a color management unit;

a content considering resizing unit; and a transcoding unit, wherein the color management unit converts the demanded image into a color space independent from the image input unit and the display unit according to the color management profile of the demanded image and, also, converts the demanded image which is subjected to the combination of image processing methods into a color space of the display unit;

the content considering resizing unit decides a changed image size which is an image size to which a size of the demanded image is changed depending on the resolution and the numbers of pixels in height and width of the display unit; selects the combination of image processing methods according to a content description file which is information relating to a material contained in the demanded image, an objectdistance in the demanded image, and a usage of the demanded image; decides parameters of the combination of image processing methods according to an image size of the demanded image and the content description file; applies the combination of image processing methods the parameters of which are adjusted to the demanded image of which the color space is changed by the color management unit; and changes the size of the demanded image after applying the combination of image processing methods into the changed image size; and the transcoding unit converts the demanded image after converted into the color space of the display unit by applying the combination of image processing methods into a usable format.

21. The image display device according to claim 20, wherein the color management unit converts the demanded image into the color space independent from the image input unit and the display unit in accordance with the color management profile and converts the demanded image into the color space of the display unit in accordance with the color characteristics and the terminal ambient environment conditions of the display unit.

22. The image display device according to claim 17, further comprising;

a processing database for deciding an image processing item in accordance with the terminal characteristics and the terminal ambient environment conditions;

an image conversion unit for selecting a combination of image processing methods in accordance with the terminal characteristics, deciding parameters of the combination of image processing methods in accordance with the terminal ambient environment conditions and the content description file, and applying the combination of image processing methods the parameters of which are adjusted to the demanded image; and a transcoding unit for converting the demanded image after applying the combination of image processing methods into a usable format.

23. An information processor comprising:

a delivery unit to which an image demand signal, terminal characteristics, and terminal ambient environment conditions are input;

a processing database accumulating a combination of image processing methods decided in accordance with the terminal characteristics and the terminal ambient environment conditions;

a color management unit for converting the demanded image into a color space independent from the image input unit and the display unit in accordance with a color management profile and, further, converts the demanded image after applying the combination of image processing methods into a color space of the display unit;

a content considering resizing unit for deciding a changed image size in accordance with a resolution and numbers of pixels in height and width of the display unit, selecting the combination of image processing methods in accordance with a content description file, deciding parameters of the combination of image processing methods in accordance with a size of the demanded image and the content description file, applying the image processing methods the parameters of which are adjusted to the demanded image of the independent color space, and changing the demanded image after applying the combination of image processing methods into the changed image size; and a transcoding unit for converting the demanded image after performing the conversion into the color space of the display unit and the combination of image processing methods into a usable format, wherein the delivery unit outputs the demanded image after performing the conversion into the color space of the display unit and the combination of image processing methods.

24. The information processor according to claim 23, wherein the color management unit converts the demanded image into the color space independent from the image input unit and the display unit in accordance with the color management profile and converts the demanded image into the color space of the display unit in accordance with the terminal characteristics and the terminal ambient environment conditions of the display unit.

25. An information processor comprising:

a delivery unit to which an image demand signal, terminal characteristics, and terminal ambient environment conditions are input;

an image processing database for accumulating a plurality of images with each of which a content description file and a color management profile are stored and outputting a demanded image indicated by the image demand signal;

a processing database accumulating a combination of image processing methods decided in accordance with the terminal characteristics and the terminal ambient environment conditions;

an image conversion unit for selecting a combination of image processing methods for the demanded image read out from the image database in accordance with the terminal characteristics, deciding parameters of the combination of image processing methods in accordance with the terminal ambient environment conditions and the content description file, and applying the image processing methods the parameters of which are adjusted to the demanded image; and a transcoding unit for converting the demanded image after applying the combination of image processing methods into a usable formant, wherein the delivery unit outputs the demanded image after the conversion into the usable format.

* * * * *

UNITED STATES PATENT AND TRADEMARK OFFICE
CERTIFICATE OF CORRECTION

| | |
|---|---|
| PATENT NO. | : 7,330,189 B2 |
| APPLICATION NO. | : 10/758332 |
| DATED | : February 12, 2008 |
| INVENTOR(S) | : Mutsuko Nichogi et al. |

Page 1 of 1

It is certified that error appears in the above-identified patent and that said Letters Patent is hereby corrected as shown below:

Column 19

Line 62, between "containing" and "least", insert -- at --.

Signed and Sealed this

Sixteenth Day of December, 2008

JON W. DUDAS
*Director of the United States Patent and Trademark Office*